(12) United States Patent
Huang et al.

(10) Patent No.: US 10,834,660 B2
(45) Date of Patent: Nov. 10, 2020

(54) METHOD AND APPARATUS FOR UPDATING NETWORK RTK REFERENCE STATION NETWORK

(71) Applicant: HUAWEI TECHNOLOGIES CO., LTD., Shenzhen, Guangdong (CN)

(72) Inventors: Jingsong Huang, Wuhan (CN); Rui Yuan, Wuhan (CN); Yi Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/263,772

(22) Filed: Jan. 31, 2019

(65) Prior Publication Data
US 2019/0166542 A1    May 30, 2019

Related U.S. Application Data

(63) Continuation of application No. PCT/CN2017/079644, filed on Apr. 7, 2017.

(30) Foreign Application Priority Data

Aug. 8, 2016   (CN) .......................... 2016 1 0640691

(51) Int. Cl.
*H04W 4/00* (2018.01)
*H04W 40/24* (2009.01)
(Continued)

(52) U.S. Cl.
CPC .......... *H04W 40/248* (2013.01); *G01S 19/04* (2013.01); *G01S 19/07* (2013.01); *G01S 19/071* (2019.08);
(Continued)

(58) Field of Classification Search
CPC .......... G01S 19/04; G01S 19/07; G01S 19/44; H04W 16/18; H04W 40/248; H04W 64/00; H04W 84/18
See application file for complete search history.

(56) References Cited

U.S. PATENT DOCUMENTS

| 2006/0034293 | A1* | 2/2006 | Nuzman | H04L 41/0896 370/395.41 |
| 2009/0135057 | A1* | 5/2009 | Vollath | G01S 19/32 342/357.27 |

(Continued)

FOREIGN PATENT DOCUMENTS

| CN | 101498785 A | 8/2009 |
| CN | 101661096 A | 3/2010 |

(Continued)

OTHER PUBLICATIONS

Chinese Office Action dated Apr. 25, 2019 in corresponding Chinese Patent Application No. 201610640691.0 (5 pages).
(Continued)

*Primary Examiner* — Minh Trang T Nguyen
(74) *Attorney, Agent, or Firm* — Conley Rose, P.C.

(57) ABSTRACT

Embodiments of this application disclose a method for updating a network RTK reference station network including: if there is a newly added node in a current reference station network, determining a position relationship between the newly added node and each node in the current reference station network; determining N target nodes in the current reference station network according to a preset rule based on the position relationship; determining, based on the N target nodes, M nodes connected to each of the N target nodes, where the M nodes belong to the current reference station network; and performing network construction on the M nodes and the newly added node according to a Delaunay triangulated network construction rule. According to the
(Continued)

method for updating a network RTK reference station network, fast networking can be implemented and efficiency can be improved.

20 Claims, 15 Drawing Sheets

(51) Int. Cl.
G01S 19/07 (2010.01)
G01S 19/04 (2010.01)
H04W 16/18 (2009.01)
H04W 64/00 (2009.01)
G01S 19/44 (2010.01)
H04W 84/18 (2009.01)

(52) U.S. Cl.
CPC ........... *H04W 16/18* (2013.01); *H04W 64/00* (2013.01); *G01S 19/44* (2013.01); *H04W 84/18* (2013.01)

(56) References Cited

U.S. PATENT DOCUMENTS

| | | | |
|---|---|---|---|
| 2015/0355339 A1* | 12/2015 | Van Den Bossche | G01S 19/22 342/357.61 |
| 2016/0205157 A1* | 7/2016 | Chu | H04L 45/122 370/312 |
| 2018/0210089 A1 | 7/2018 | Wang et al. | |
| 2018/0246218 A1 | 8/2018 | Zhang et al. | |
| 2018/0246219 A1 | 8/2018 | Zhang et al. | |
| 2018/0246220 A1 | 8/2018 | Zhang et al. | |

FOREIGN PATENT DOCUMENTS

| | | |
|---|---|---|
| CN | 104833994 A | 8/2015 |
| CN | 105068096 A | 11/2015 |
| CN | 106294524 A | 1/2017 |
| WO | 2015157641 A1 | 10/2015 |

OTHER PUBLICATIONS

International Search Report dated Jun. 23, 2017 in corresponding International Application No. PCT/CN2017/079644.
Lim, S., et al., "A Conceptual Framework for Server-Based GNSS Operations," Journal of Global Positioning Systems, XP055599936, vol. 7, No. 2, Dec. 1, 2008, pp. 125-132.
Tang, W., et al., "Algorithms for Sparse Network-based RTK GPS Positioning and Performance Assessment," XP055599935, Journal of Navigation, vol. 66, No. 3, May 1, 2013, pp. 335-348.
Mostafavi, M., et al., "Delete and insert operations in Voronoi/Delaunay methods and applications," XP055600345, Computers and Geosciences, vol. 29, No. 4, May 1, 2003, pp. 523-530.
Eguchi, G., "Delaunay Triangulations," XP055600530, Lectures of Course 6.838—Geometric Computation, Mar. 3, 2005, 80 pages.
Foreign Communication From a Counterpart Application, European Application No. 17838358.4, Extended European Search Report dated Jul. 16, 2019, 13 pages.
Mei Shengqiang et al. "Construction of Vast Cors Fiducial Stations Network Based on Delaunay Triangulate Networks." Journal of Geodesy and Geodynamics, vol. 28, No. 1, Feb. 2008, 5 pages.
Hao Pu et al. "On the Method for Fast Constructing Delaunay Triangulation DTM." China Railway Science, vol. 22 No. 6, Dec. 2001, 6 pages.
Zhangfeng Song et al. "Fast Locating Algorithm Based on Triangular Grid Model." China Railway Science, vol. 23 No. 1, Feb. 2002, 4 pages.
International Search Report dated Jun. 23, 2017 in corresponding International Patent Application No. PCT/CN2017/079644 (7 pages).
Written Opinion of International Searching Authority dated Jun. 23, 2017 in corresponding International Patent Application No. PCT/CN2017/079644 (5 pages).

* cited by examiner

METHOD AND APPARATUS FOR UPDATING NETWORK RTK REFERENCE STATION NETWORK

CROSS-REFERENCE TO RELATED APPLICATIONS

This application is a continuation of International Application No. PCT/CN2017/079644, filed on Apr. 7, 2017, which claims priority to Chinese Patent Application No. 201610640691.0, filed on Aug. 8, 2016, The disclosures of the aforementioned applications are hereby incorporated by reference in their entireties.

TECHNICAL FIELD

Embodiments of this application relate to the satellite positioning field, and in particular, to a method and an apparatus for updating a network RTK reference station network.

BACKGROUND

In Network Real Time Kinematic (NRTK) relative positioning, several (usually at least three) fixed observation stations (referred to as reference stations) are evenly and sparsely deployed in a relatively vast area to constitute a reference station network that covers an area, and one or more of the reference stations are used as reference to provide network differential information for a user in real time, to correct an error of a positioning apparatus such as a Global Positioning System (Global Positioning System, GPS) or Beidou of the user and implement high-accuracy positioning.

To meet a need of city construction, some reference stations are newly established in an original reference station network. To quickly integrate the newly-added reference stations into the reference station network, local network reconstruction needs to be performed on the reference station network, to complete real-time construction of a new network.

The prior art provides a solution for constructing a network when a station is newly added to a reference station network. If the newly added station is located inside the reference station network, all triangles in the reference station network are traversed, all triangles whose circumcircles include the station are searched for, and Delaunay network construction is re-performed on a station included in a selected triangle and the newly added station. If the newly added station is located outside the reference station network, Delaunay network construction is re-performed on all stations in the reference station network and the newly added station, or in other words, network updating after the station is added is implemented.

In the prior art, if global network construction is performed, resources are wasted to some extent. If a network reconstruction range is selected based on whether a circumcircle of a triangle includes a newly added station, the circumcircle can be determined only after a center and a radius of the circumcircle of the triangle are determined, and a process is relatively complex.

SUMMARY

In view of the above, embodiments of this application provide a method and an apparatus for updating a network RTK reference station network, to implement fast networking and improve efficiency.

According to a first aspect, a method for updating a network RTK reference station network is provided, where a reference station network is a Delaunay triangulated network including a plurality of reference stations on a two-dimensional plane, a node in the reference station network represents one of the plurality of reference stations, and the method includes: if there is a newly added node in a current reference station network, determining a position relationship between the newly added node and each node in the current reference station network; determining N target nodes in the current reference station network according to a preset rule based on the position relationship; determining, based on the N target nodes, M nodes connected to each of the N target nodes, where the M nodes belong to the current reference station network; and performing network construction on the M nodes and the newly added node according to a Delaunay triangulated network construction rule, where M is a positive integer and N is a positive integer.

When a reference station is newly added to a reference station network, fast re-networking is implemented in a local range by using a visualized multi-tree structure based on a position relationship between the newly added station and the reference station network, and a process is simple and highly efficient.

With reference to the first aspect, in a first possible implementation of the first aspect, when the position relationship indicates that the newly added node is located inside a first triangle in the current reference station network, the determining N target nodes in the current reference station network according to a preset rule based on the position relationship is specifically: separately determining three vertices of the first triangle as target nodes, where there is only the newly added node inside the first triangle.

With reference to some implementations of the first aspect, in a second possible implementation of the first aspect, when the position relationship indicates that the newly added node is located on a common side of two triangles in the current reference station network, the determining N target nodes in the current reference station network according to a preset rule based on the position relationship is specifically: separately determining four vertices of the two triangles as target nodes.

With reference to some implementations of the first aspect, in a third possible implementation of the first aspect, when the position relationship indicates that the newly added node is located outside the current reference station network, the determining N target nodes in the current reference station network according to a preset rule based on the position relationship is specifically: determining a node closest to the newly added node as a target node.

With reference to some implementations of the first aspect, in a fourth possible implementation of the first aspect, when the position relationship indicates that the newly added node is located on a boundary of the current reference station network, the determining N target nodes in the current reference station network according to a preset rule based on the position relationship is specifically: separately determining two endpoints of the boundary as target nodes.

With reference to some implementations of the first aspect, in a fifth possible implementation of the first aspect, after the performing network construction on the M nodes and the newly added node according to a Delaunay triangulated network construction rule, the method further includes: obtaining an initial value of a status parameter of the newly added node by using an interpolation method based on status parameters of two nodes that constitute a triangle with the newly added node, where the status parameter includes a tropospheric error parameter and an ionospheric error parameter.

Initial values of some status parameters of the newly added station can be obtained through interpolation, to shorten initialization time. After network construction is completed, an original network is evolved to a new network to provide a service for a user, to ensure that the network continuously provides a service.

With reference to some implementations of the first aspect, in a sixth possible implementation of the first aspect, the method further includes: if there is a faulty node in a first reference station network, determining, in the first reference station network based on the faulty node, J nodes connected to the faulty node; after the faulty node is deleted, performing network construction on the J nodes according to the Delaunay triangulated network construction rule to obtain a second reference station network; determining a newly added baseline in the second reference station network based on the first reference station network and the second reference station network; and obtaining a status parameter of the newly added baseline based on a status parameter of a non-updated baseline, where J is a positive integer, a reference station network obtained by performing network construction on the M nodes and the newly added node according to the Delaunay triangulated network construction rule is the first reference station network, a baseline represents relative positions of two reference stations, the non-updated baseline constitutes a shortest path from a start point of the newly added baseline to an end point of the newly added baseline, and the status parameter includes an ionospheric error parameter, a tropospheric error parameter, and an ambiguity parameter.

When a faulty reference station needs to be deleted from the reference station network, a new baseline is obtained through network reconstruction, and a status parameter of the new baseline is quickly calculated by using a vector addition method based on a status parameter of a known baseline, to improve working efficiency, and ensure that a system continuously provides a service.

With reference to some implementations of the first aspect, in a seventh possible implementation of the first aspect, a network structure of the first reference station network is stored, to update the second reference station network to the first reference station network based on the network structure of the first reference station network when a reference station represented by the faulty node returns to normal.

Optionally, when the faulty reference station is recovered, whether a data processing center stores the network structure of the first reference station network, status parameters of all reference stations forming the first reference station network, or the like is first queried. If the data processing center stores the network structure of the first reference station network, the status parameters of all the reference stations forming the first reference station network, or the like, a network topology of the first reference station network may be directly recovered.

Networking before fault is recovered in a memorization manner, so that working efficiency can be improved and working continuity of the system can be ensured.

According to a second aspect, an apparatus for updating a network RTK reference station network is provided, and is configured to perform the method in the first aspect or any possible implementation of the first aspect. Specifically, user equipment includes a unit configured to perform the method in the first aspect or any possible implementation of the first aspect.

According to a third aspect, an apparatus is provided, including a memory, a processor, a transceiver, and a bus system. The memory, the processor, and the transceiver are connected by using the bus system. The memory is configured to store an instruction. The processor is configured to execute the instruction stored in the memory, to control the transceiver to receive a signal or send a signal. In addition, when the processor executes the instruction stored in the memory, the processor performs the method in the first aspect or any possible implementation of the first aspect.

According to a fourth aspect, a computer storage medium is provided, configured to store a computer software instruction used in the foregoing method, and the computer storage medium includes a program designed for performing the foregoing aspects.

These aspects or other aspects of this application are clearer and more comprehensible in descriptions of the following embodiments.

DESCRIPTION OF EMBODIMENTS

The following clearly describes the technical solutions in the embodiments of this application with reference to the accompanying drawings in the embodiments of this application.

In NRTK positioning, several (usually at least three) fixed observation stations (referred to as reference stations) are evenly and sparsely deployed in a relatively vast area to constitute a reference station network, and one or more of the reference stations are used as reference to provide network differential information for a user in real time, to correct an error of a GNSS of the user and implement high-accuracy positioning.

Currently, a continuously operating reference system (Continuously Operating Reference System, CORS) focusing on a network RTK technology is widely established across the world. The system is a multi-functional service system that is mainly used to improve a satellite navigation and positioning service, and gradually becomes an infrastructure for high-accuracy surveying and mapping and high-accuracy navigation. Currently, each CORS reference station has a dedicated maintenance department and a dual-host standby or the like. Reliability of the CORS reference station is relatively high but a network reconstruction possibility of the CORS reference station is low. Therefore, insufficient attention is paid to dynamic networking, and a network is usually corrected in a network-wide restart manner.

Compared with the CORS system, in a mobile network, when a positioning reference station and a mobile network base station are integrated into a network, the network includes a large quantity of base stations, and a relatively large quantity of reference stations need to be additionally established. However, accuracy of a positioning apparatus of a single base station is low, costs of the single base station are low, and environments in which some reference stations are located may be relatively harsh. This causes the integrated network to dynamically change more frequently, and a service key performance indicator (Key Performance Indicator, KPI) in the mobile network is higher than that in the CORS. Therefore, a solution to a dynamic networking problem becomes a key technology of integrated networking.

It should be understood that the embodiments of this application can be applied to the CORS system, and can also be applied to the mobile network. The technical solutions in this application can be used provided that dynamic networking updating needs to be performed in a reference station network. This is not limited in this application. For ease of description, the following uses the CORS system as an example for description.

Figures 1, 2:
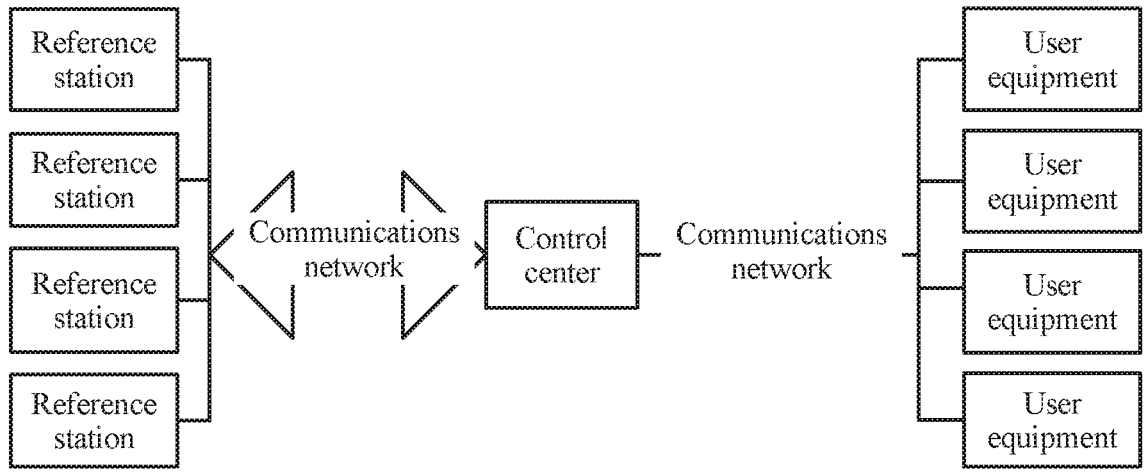
FIG. 1 shows a possible application scenario according to an embodiment of this application.
FIG. 2 is a schematic block diagram of a method for updating a network RTK reference station network according to an embodiment of this application.

FIG. 1 is a diagram of a possible application scenario according to an embodiment of this application. As shown in FIG. 1, a CORS system mainly includes the following several parts: a reference station, a control center, data communication, and user equipment.

The reference station is a fixed reference station, and reference stations are distributed in an entire network. A CORS network may include numerous stations, but at least three stations are required. A distance between stations may be 70 km. The reference station is connected to the control center by using a communications cable, and data is transmitted to the control center in real time.

The control center is a core of the entire system, and serves as both a communication control center and a data processing center. The control center communicates with all reference stations by using a communication cable (an optical cable, a telephone line, or the like), and communicates with a mobile user by using a wireless network (a Global System for Mobile Communications, a general packet radio service, or the like). A computer real-time system controls operation of the entire system. Therefore, software in the control center serves as both data processing software and system management software.

A data communication part includes communication between the reference station and the control center and communication between the control center and a user. A communications network between the reference station and the control center is responsible for transmitting data of the reference station to the control center in real time. A communications network between the control center and the user is responsible for sending network calibration data to the user. Generally, a network RTK system has two working manners: a unidirectional manner and a bidirectional manner. In the unidirectional manner, the user merely obtains calibration data from the control center, and data obtained by all users should be the same. In the bidirectional manner, the user further needs to report a rough position of the user to the control center, the control center pertinently generates calibration data and transmits the calibration data to a specific user, and data obtained by the users may be different.

The user equipment is a receiver on which a modem for wireless communication and a related device are installed.

FIG. 2 shows a method 100 for updating a network RTK reference station network according to an embodiment of this application. A reference station network is a Delaunay triangulated network including a plurality of reference stations on a two-dimensional plane, and a node in the reference station network represents one of the plurality of reference stations. As shown in FIG. 2, the method may be performed by the control center in FIG. 1. For example, the method may be performed by a data processing center of the control center. The method 100 includes the following steps:

S110. If there is a newly added node in a current reference station network, determine a position relationship between the newly added node and each node in the current reference station network.

S120. Determine N target nodes in the current reference station network according to a preset rule based on the position relationship.

S130. Determine, based on the N target nodes, M nodes connected to each of the N target nodes, where the M nodes belong to the current reference station network.

S140. Perform network construction on the M nodes and the newly added node according to a Delaunay triangulated network construction rule, where M is a positive integer and N is a positive integer.

Therefore, according to the method for updating a network RTK reference station network provided in this embodiment of this application, when a station is newly added to a reference station network, fast re-networking is implemented in a local range by using a visualized multitree based on a position relationship between the newly added station and each node in the current reference station network, and a process is simple and highly efficient.

In a reference station network, all reference stations in an area are simplified as discrete data points on the two-dimensional plane, and these discrete data points form a specific network structure according to a rule. Usually, the reference station network may be automatically constructed according to the Delaunay triangulated network construction rule. Advantages of a triangulated network structure are self-evident. When a user moves in a triangulated area, a selected reference station always maintains a relatively strong correlation with a baseline (relative positions of reference stations) on which a mobile station is located. In addition, when the mobile station leaves the triangle, a system locks the mobile station in a new triangulated unit by selecting a triangulated area in real time. In this way, a movement track of the user always coincides with a corrected area to a maximum extent, relatively high error correction accuracy is ensured, and calculation burden of the control center is reduced because only three reference stations are selected to participate in positioning resolving.

A Delaunay triangulated network (Delaunay Triangulated Irregular Net, DTIN) is defined as follows: (1) A circumcircle of any triangle in the network does not contain a fourth point. (2) If four points are concyclic, a shorter diagonal of a convex quadrilateral is drawn to obtain two new triangles. If any triangle in a network meets the foregoing two conditions, the network is a DTIN.

A person skilled in the art should understand that a network topology obtained by performing Delaunay triangulated network construction on same reference stations is unique.

Specifically, steps of performing Delaunay triangulated network construction may be as follows:

(1) A static joint measurement is performed on each reference station and a higher level GNSS control point in an area to obtain real-time information of each reference station, baseline resolving and network adjustment resolving are performed on the real-time information of each reference station to obtain WGS-84 (World Geodetic System-1984 Coordinate System) terrestrial coordinates of each reference station, Gaussian projection is performed on the WGS-84 terrestrial coordinates by using a local meridian of the reference station as a central meridian, to obtain WGS-84 plane coordinates, and 7-parameter transformation or 4-parameter transformation is further performed on the WGS-84 plane coordinates to obtain local plane coordinates. A discrete point position of each pair of local plane coordinates on the two-dimensional plane represents a corresponding reference station. A baseline on which two discrete point positions closest to each other are located is used as an initial edge of an initial triangle. The baseline represents relative positions of two reference stations in a reference station network.

A baseline is a difference between three-dimensional coordinates that are of GNSS receivers and that are calculated by using observation data collected by the receivers that perform simultaneous observation. The baseline is a result of GNSS relative positioning. The baseline is an observation value during network adjustment resolving in a GNSS network construction process. Relative positioning is a positioning method for determining relative positions (a difference between coordinates) of several receivers that synchronously track a same GNSS satellite signal. Relative positions of two points may be represented by using a baseline vector. A closed graph formed by a plurality of end-to-end connected baseline vectors is referred to as a closed loop.

(2) Delaunay network construction is performed on the initial edge of the initial triangle in step (1) to obtain a third point of the triangle, the third point and the initial edge form the initial triangle, and the third point is the discrete point in step (1).

(3) Three edges of the initial triangle in step (2) are separately used as initial edges, and step (2) is repeatedly performed to obtain a new triangle.

(4) Two edges that are of each new triangle and that are not constructed are separately used as initial edges, and step (2) is repeatedly performed to obtain a new triangle.

(5) Step (4) is repeatedly performed until all discrete points in step (1) are traversed to obtain a triangulated network, namely, a reference station network.

With reference to FIG. 3 to FIG. 11, the following describes in detail a process of selecting a network construction range for each position relationship between a newly added reference station and a reference station network in embodiments of this application. The reference station network is a Delaunay triangulated network including a plurality of reference stations on a two-dimensional plane, and a node in the reference station network represents one of the plurality of reference stations.

Description of Embodiment 1

When a newly added node is located inside a current reference station network and is located inside a triangle, in other words, there is only the newly added node inside the triangle, three vertices of the triangle in which the newly added node is located are determined as three target nodes, and an entire reference station network is of a multi-tree structure. A range surrounded by all nodes connected to the three target nodes in the current reference station network is selected as an update range according to "an empty circumcircle property that a circumcircle of each Delaunay triangle does not include any other point in a plane" of a Delaunay triangulated network. In other words, network construction is re-performed on all nodes (including the newly added node) within this range.

Figure 3:
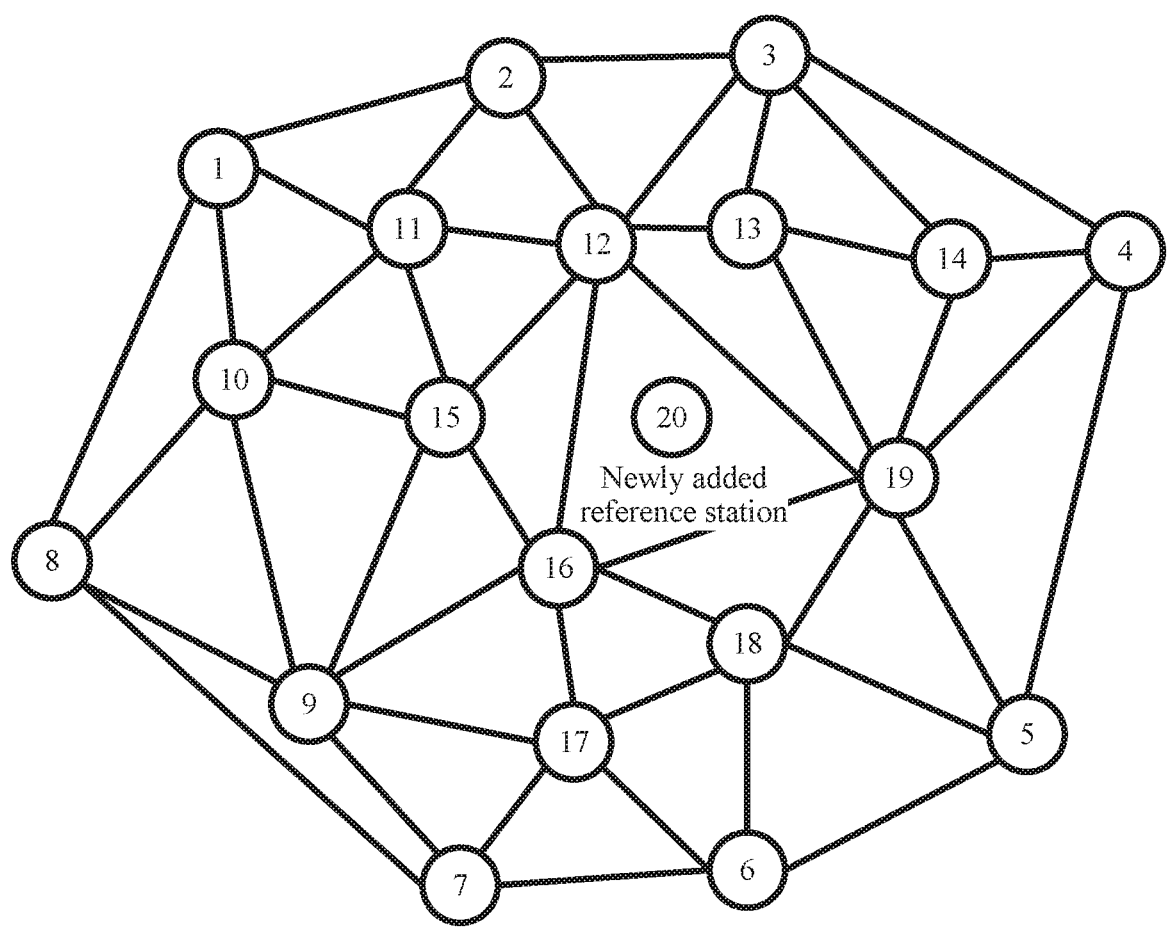
FIG. 3, FIG. 4, and FIG. 5 are schematic diagrams of a method for selecting a network reconstruction range when a reference station is newly added according to an embodiment of this application.
Figure 4:
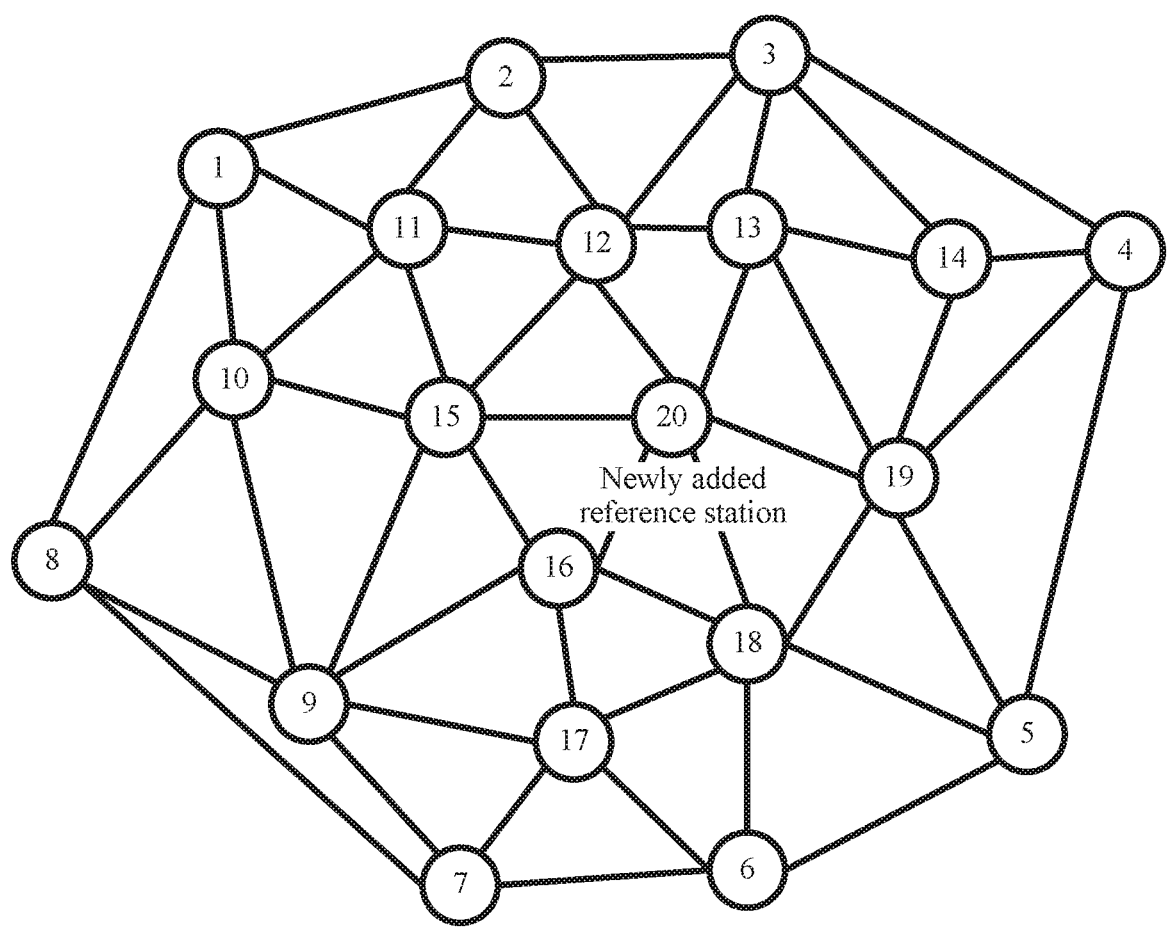
Figure 5:
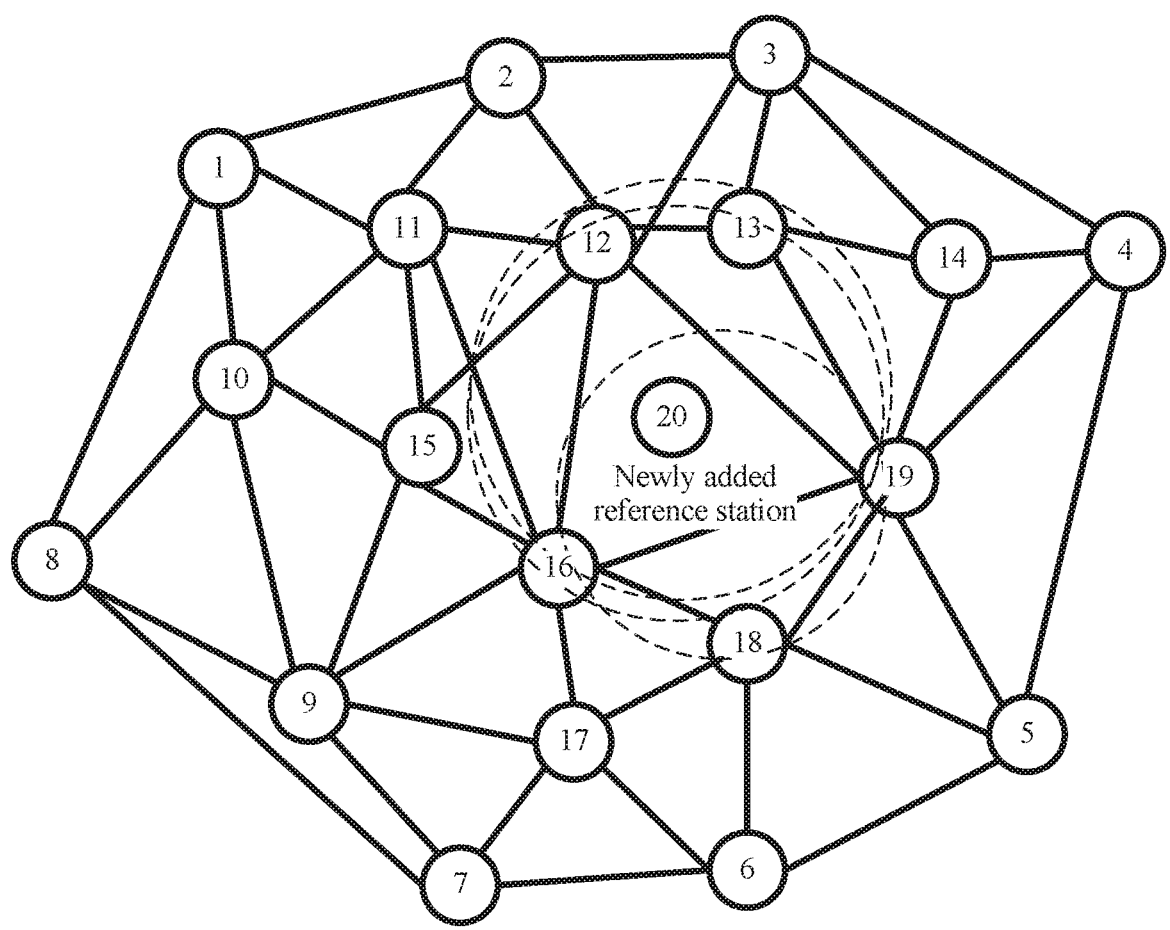

For example, as shown in FIG. 3, when a newly added node 20 is located inside a triangle formed by nodes 12, 16, and 19, vertices 12, 16, and 19 of the triangle may be selected as three target nodes, and a range surrounded by all nodes 2, 3, 11, 15, 9, 17, 18, 5, 14, 4, and 13 connected to the three target nodes 12, 16, and 19 is an update range. Delaunay triangulated network construction is re-performed on all nodes 2, 3, 11, 15, 9, 17, 18, 5, 14, 4, 13, 12, 16, and 19 and the newly added node 20 within this range. A result of the network construction is shown in FIG. 4. FIG. 5 is used for analysis to explain why a network in FIG. 3 changes to a triangulated network shown in FIG. 4. It can be learned from FIG. 5 that the newly added node is located in three circles in FIG. 5, the three circles are circumcircles of corresponding Delaunay triangles, and this is contrary to the property "a circumcircle of each Delaunay triangle does not include any other point in a plane" of the Delaunay triangulated network. Therefore, a connection line in these corresponding triangles varies.

Description of Embodiment 2

Figure 6:
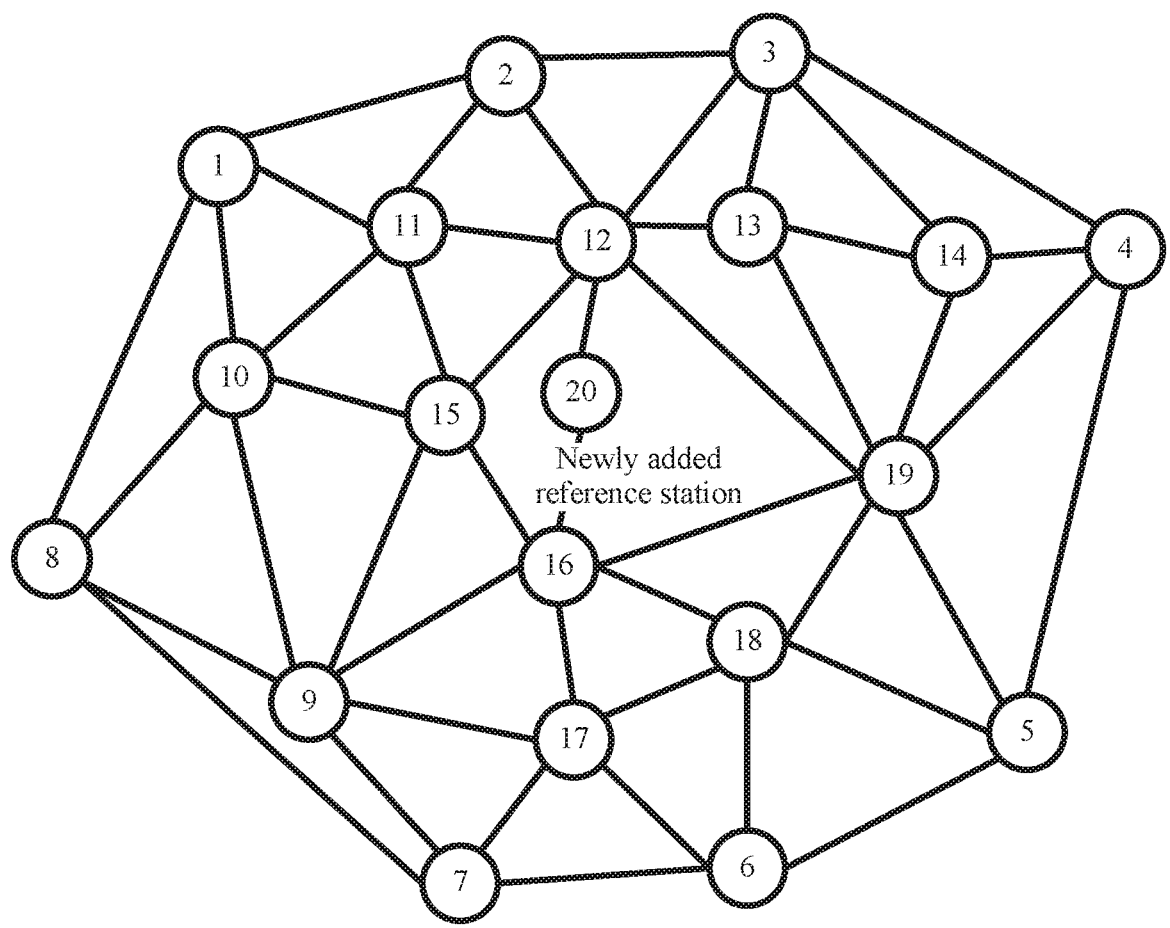
FIG. 6 and FIG. 7 are other schematic diagrams of a method for selecting a network reconstruction range when a reference station is newly added according to an embodiment of this application.

As shown in FIG. 6, when a newly added node is located inside a current reference station network and the newly added node is located on a common side of two triangles, vertices of the two triangles of the common side on which the newly added node is located are determined as target nodes, an entire reference station network is of a multi-tree structure, a range of all triangles in which the vertices of the two triangles are separately located is an update range. Network construction is re-performed on all nodes and the newly added node within the update range.

Figure 7:
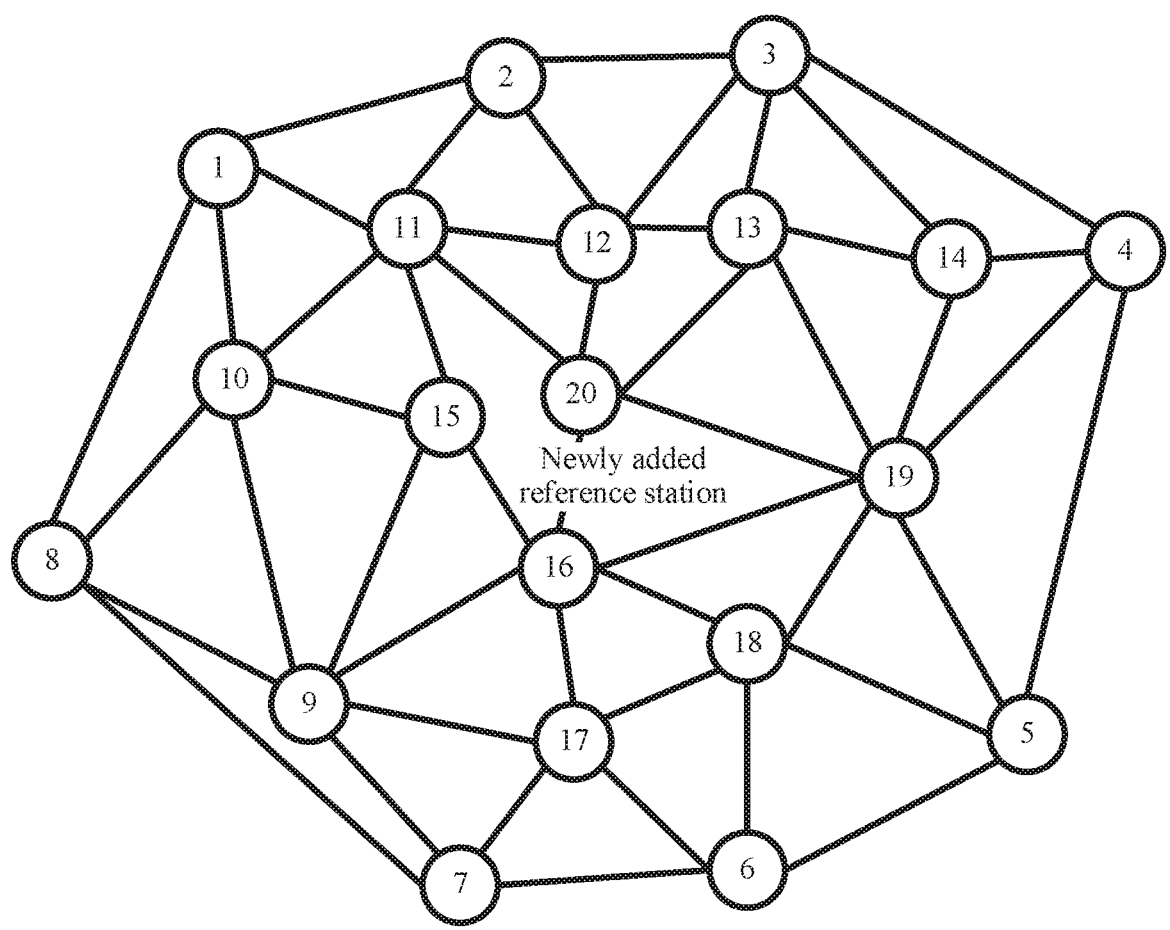

For example, as shown in FIG. 6, a newly added node 20 is located on a common side (an edge formed by a node 12 and a node 16) of two triangles (a triangle formed by nodes 12, 15, and 16 and a triangle formed by nodes 12, 16, and 19), vertices 12, 15, 16, and 19 of the two triangles are determined as target nodes, and a range surrounded by all nodes 2, 11, 3, 9, 17, 18, 5, 14, 4, 13, and 10 connected to the four target nodes 12, 15, 16, and 19 is an update range. Delaunay triangulated network construction is re-performed on all nodes 12, 15, 16, 19, 2, 11, 3, 9, 17, 18, 5, 14, 4, 13, and 10 and the newly added node 20 within the update range. A result of the network construction is shown in FIG. 7.

Description of Embodiment 3

Figure 8:
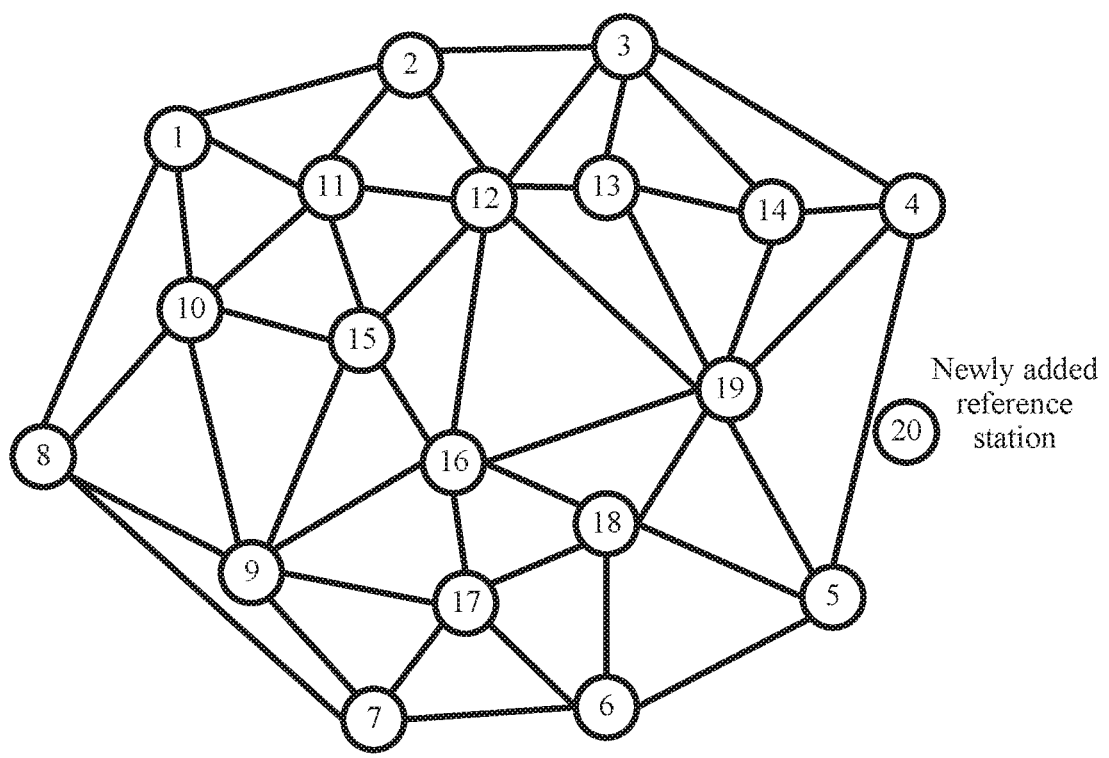
FIG. 8 and FIG. 9 are still other schematic diagrams of a method for selecting a network reconstruction range when a reference station is newly added according to an embodiment of this application.

As shown in FIG. 8, when a newly added node is located outside a current reference station network, a node closest to the newly added node may be determined as a target node, an entire reference station network is of a multi-tree structure, and a range surrounded by a triangle in which the target node is located is selected as an update range of the reference station network. Then, network construction is re-performed on all nodes and the newly added node within the update range (including a boundary).

Figure 9:
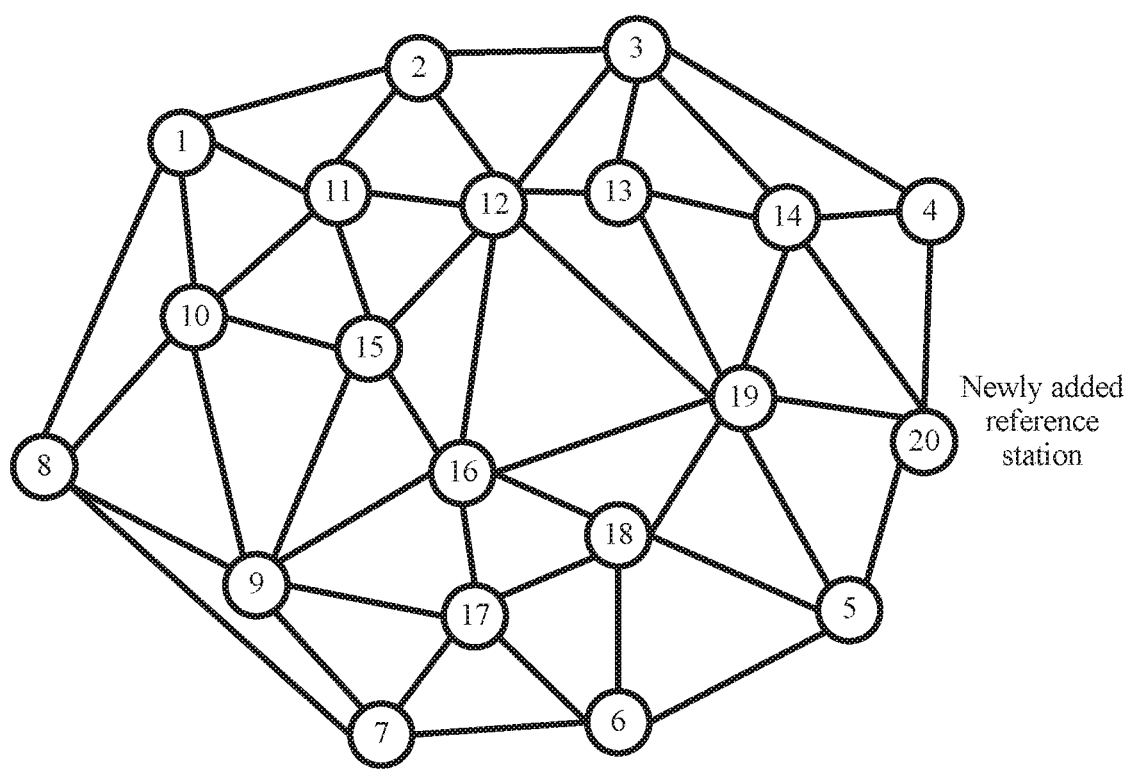

For example, as shown in FIG. 8, when a node 20 is newly added outside the reference station network, a node 19 closest to the newly added node 20 may be determined as a target node, and a range surrounded by all nodes 4, 14, 13, 12, 16, 18, and 5 connected to the target node 19 is an update range. Delaunay triangulated network construction is re-performed on all the nodes 4, 14, 13, 12, 16, 18, and 5 and the newly added node 20 within the update range. A result of the network construction is shown in FIG. 9.

It should be understood that, in this embodiment of this application, the node closest to the newly added node is preferentially selected as a target node, or a node that is second closest to the newly added node may be selected as a target node, or another manner of selecting a target node may be used. This application is not limited thereto.

Description of Embodiment 4

Figure 10:
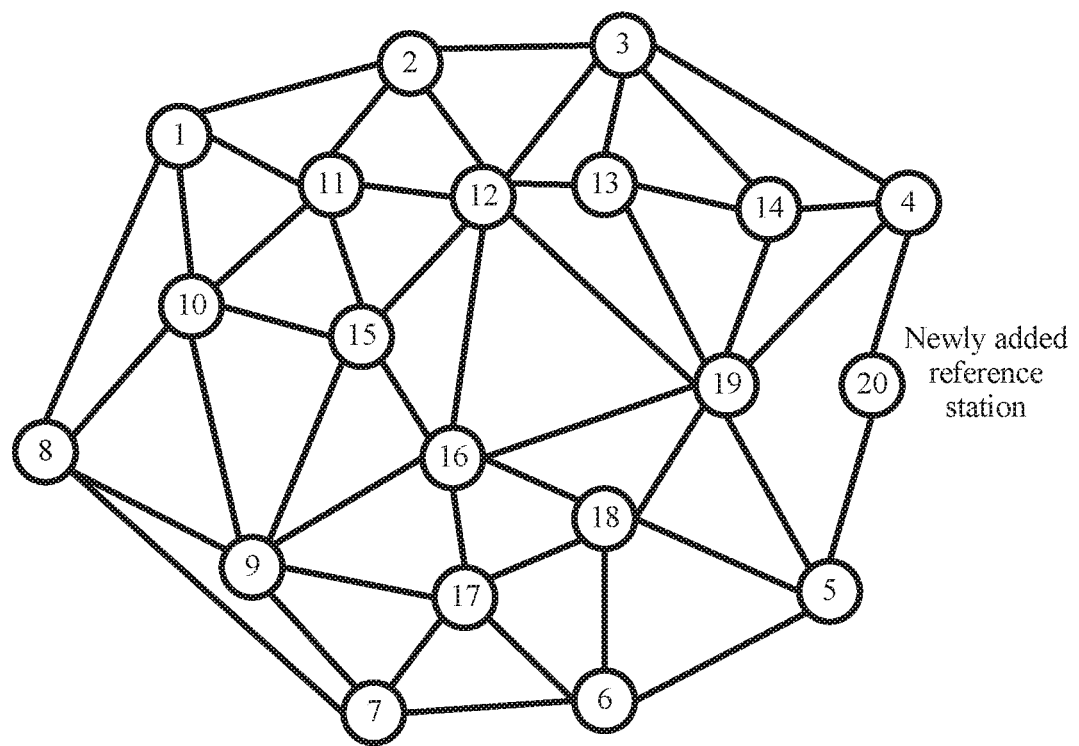
FIG. 10 and FIG. 11 are yet other schematic diagrams of a method for selecting a network reconstruction range when a reference station is newly added according to an embodiment of this application.

As shown in FIG. 10, when a newly added node is located on a boundary of a current reference station network, two endpoints of the boundary on which the newly added node is located are determined as target nodes, an entire reference station network is of a multi-tree structure, and a range surrounded by all triangles in which the two target nodes are located is selected as an update range. Then, network construction is re-performed on all nodes and the newly added node within the update range (including a boundary).

Figure 11:
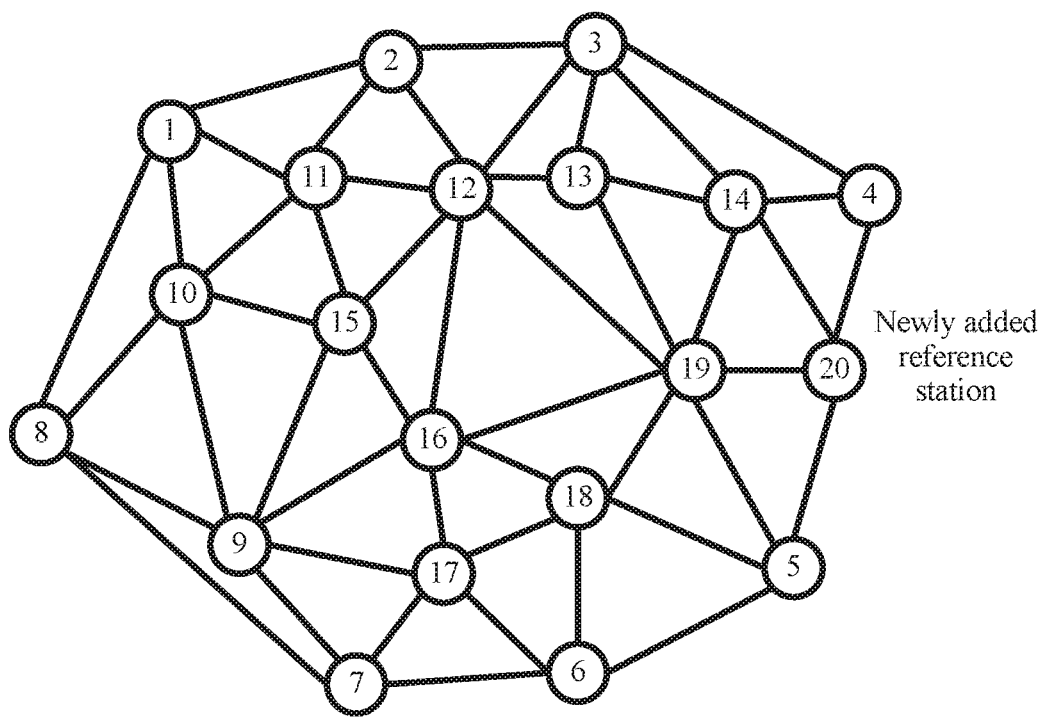

For example, as shown in FIG. 10, when a node 20 is newly added to a boundary (a boundary formed by a node 4 and a node 5), two endpoints 4 and 5 of the boundary on which the newly added node 20 is located may be determined as target nodes, and a range surrounded by all nodes 3, 14, 19, 18, and 6 connected to the two target nodes 4 and 5 is an update range. Delaunay triangulated network construction is re-performed on all nodes 3, 14, 19, 18, 6, 4, and 5 and the newly added node 20 within the update range. A result of the network construction is shown in FIG. 11.

When a station is newly added, an area surrounded by all nodes connected to a plurality of target nodes is selected as a local update range of a reference station network. According to "an empty circumcircle property that a circumcircle of each Delaunay triangle does not include any other point in a plane" and "a max-min interior angle property" of a Delaunay triangulated network, when a point is added within a triangle, an entire network is considered as a multi-tree structure, and this point affects only a circumcircle of a triangle in which a target node is located, or in other words, the circumcircle includes only three vertices of the triangle. When a circumcircle includes four or more points, a network construction property of the Delaunay triangulated network is not met, and networking should be re-performed.

Optionally, in an embodiment of this application, after network construction is performed on the M nodes and the newly added node according to the Delaunay triangulated network construction rule, the method further includes: obtaining an initial value of a status parameter of the newly added node by using an interpolation method based on status parameters of two nodes that constitute a triangle with the newly added node, where the status parameter includes a tropospheric error parameter and an ionospheric error parameter.

Specifically, when the newly added node is located inside the reference station network, after local network construction is completed, status parameters of the newly added node such as an ionospheric error parameter and a tropospheric error parameter may be obtained by using the interpolation method based on corresponding data of surrounding reference stations (namely, the N nodes) of the newly added node, and are used as initial values of filtering. Relatively high prior accuracy of the initial value may be assigned during filtering. Only an ambiguity parameter of the newly added node needs to re-estimated by re-initializing a network reconstruction area (an initialization process is performed at a background). An original network first provides a service in this case, and then a new network topology provides a service after initialization of the new network topology is completed and parameters of the newly added node are obtained. This process is simultaneously performed in two systems, to ensure that the network continuously provides a service. Because the prior accuracy of the initial value is relatively high, initialization time is significantly shortened.

When the newly added node is located outside the reference station network, after local network construction is completed and initial values of status parameters of a newly added station such as an ionospheric error parameter, a tropospheric error parameter, and an ambiguity parameter are obtained by re-initializing a dynamic network construction part, a service can be provided for the user. During initialization, an original reference station network first provides a service. An initialization process is performed at a background, and is simultaneously performed in two systems. After initialization is completed, a new reference station network provides a service, to ensure that the system continuously provides a service.

It should be understood that after network reconstruction is completed by using the technical solution provided in this application, a network reconstruction area may be further directly initialized, to obtain the status parameters of the newly added station such as the tropospheric error parameter, the ionospheric error parameter, and the ambiguity parameter.

Optionally, in an embodiment of this application, the method further includes: storing an updated reference station network. Specifically, when a faulty reference station returns to normal, the data processing center first queries for a historical record or a network plan. If there is a historical record of the reference station, the faulty reference station directly returns to an optimal state. Correspondingly, when the reference station is faulty, the data processing center needs to store the historical record of the station for recovery. If the data processing center does not have a corresponding historical record, the reference station that returns to normal is considered as a newly established reference station for processing.

It should be understood that the data processing center may store a network topology of a reference station network in which the faulty reference station is located, or may store status parameters of all stations in a network that includes the faulty reference station, or may store all baseline parameters, provided that an original network topology can be recovered. This is not limited in this application.

Optionally, in an embodiment of this application, when a plurality of reference stations are newly added, any newly added reference station is selected for dynamic network construction. After network construction is completed, a next newly added reference station is selected to re-perform local network construction. Dynamic networking of each newly added reference station is performed based on a fact that network construction on a last newly added reference station is completed. A local Delaunay triangulated network construction process of the plurality of newly added stations is a cyclic process, and a next step is performed after network construction on all newly added stations is completed.

After local Delaunay network construction on all the newly added stations is completed, all the newly added stations are initialized together. After initialization is completed, a service can be provided for the user.

Figure 12A:
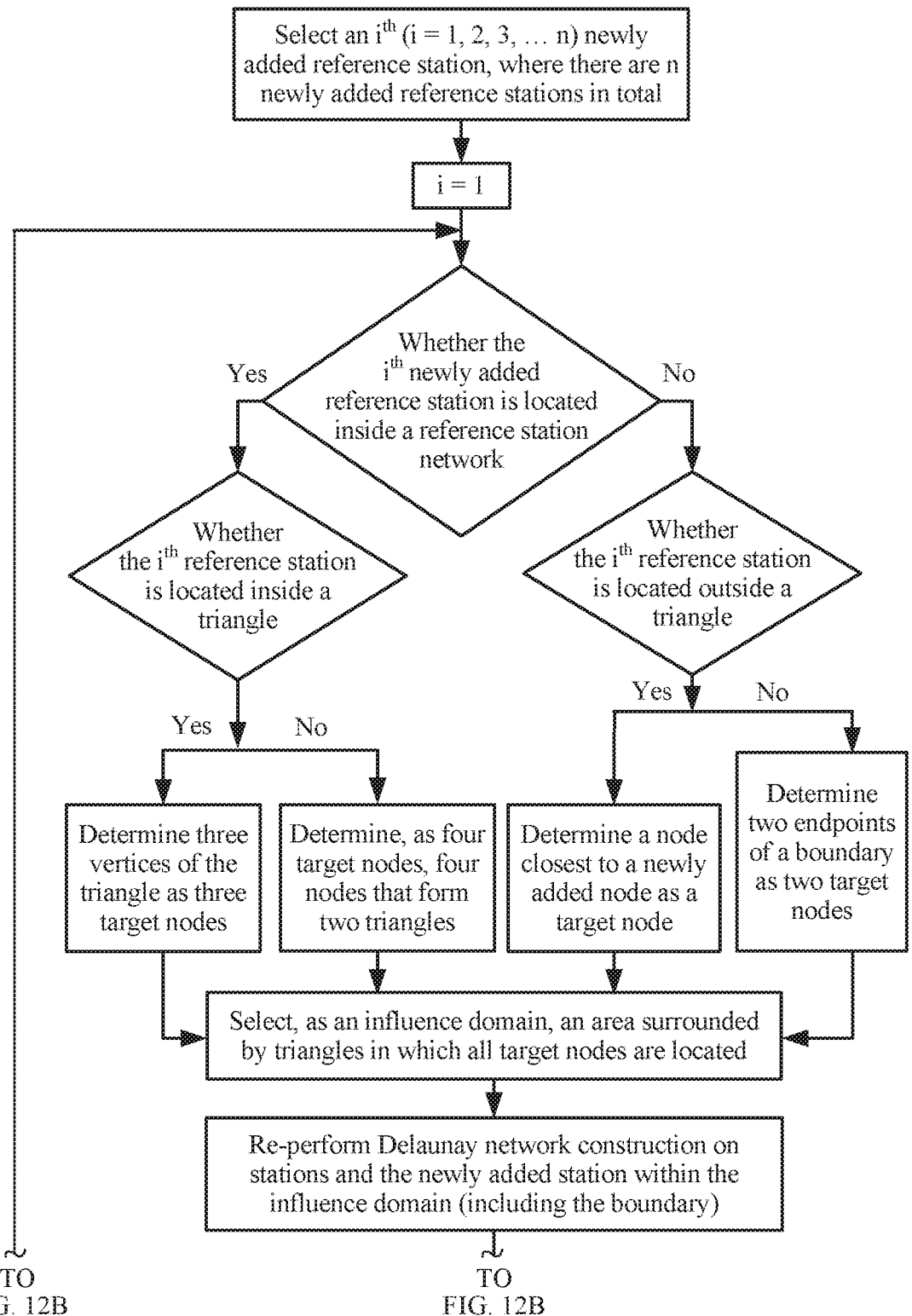
FIG. 12A and FIG. 12B are a flowchart of dynamic network construction and an initialization process when a reference station is newly added.
Figure 12B:
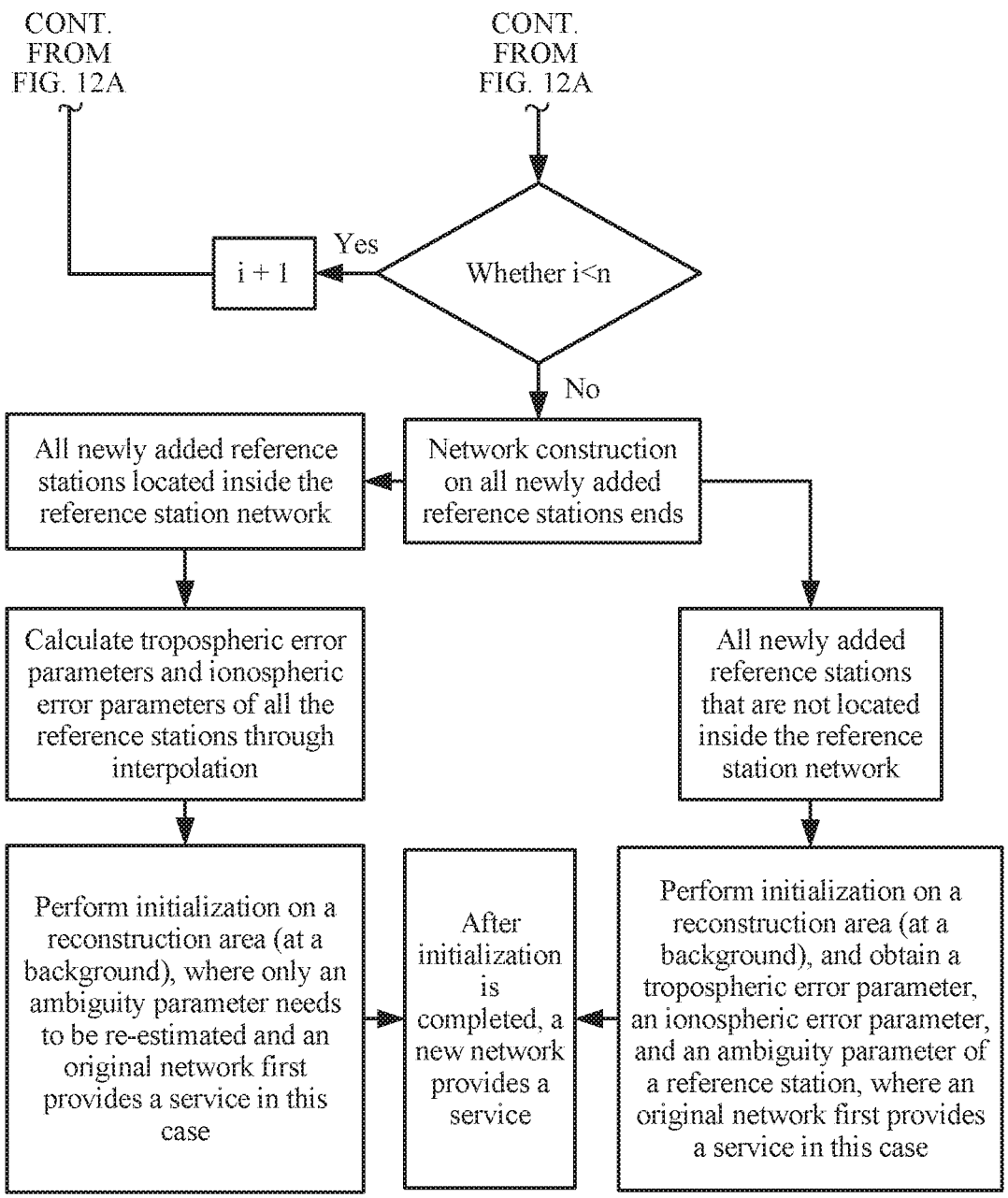

The foregoing describes in detail a process of selecting a network construction range for each position relationship between a newly added node and a first reference station network and a method for obtaining a status parameter of the newly added node. FIG. 12A and FIG. 12B are a flowchart of dynamic networking and an initialization process when a reference station is newly added.

(1) When a plurality of reference stations are newly added, one of the newly added reference stations is first selected for dynamic network construction.

(2) Whether a newly added node is inside a current reference station network is determined; and if yes, whether the newly added node is in a triangle in the current reference station network continues to be determined; or if no, whether the newly added node is outside the current reference station network continues to be determined.

(3) When the newly added node is located inside a triangle in the current reference station network, three vertices of the triangle are determined as three target nodes; when the newly added node is located on a common side of two triangles in the current reference station network, four nodes that constitute the two triangles are determined as four target nodes; when the newly added node is located outside the current reference station network, a node closest to the newly added node is determined as a target node; or when the newly added node is located on a boundary of the reference station network, two endpoints of the boundary are determined as two target nodes.

(4) A range surrounded by triangles in which all target nodes are located is selected as an influence domain, and Delaunay triangulated network construction is re-performed on all nodes and the newly added node within the influence domain (including the boundary).

(5) Whether network construction on all newly added reference stations is completed is determined; and if no, a procedure from (1) to (4) is re-performed; or if yes, a status parameter of the newly added station is obtained, to provide a service for the user.

(6) For all newly added reference stations located inside the reference station network, tropospheric error parameters and ionospheric error parameters of all the newly added stations are calculated by using an interpolation method, then a reconstruction area is initialized, only an ambiguity parameter needs to be re-estimated, and an original network first provides a service in this case. For all newly added reference stations that are not located inside the reference station network, a reconstruction area is initialized, initial values of status parameters of the newly added reference station such as a tropospheric error parameter, an ionospheric error parameter, and an ambiguity parameter are calculated, and an original network first provides a service in this case.

(7) After initialization is completed, a new network provides a service.

Optionally, when a plurality of reference stations are newly added, after local Delaunay network construction on all the newly added stations is completed, all the newly added stations may be initialized together. After initialization is completed, a service can be provided for the user.

Figure 13:
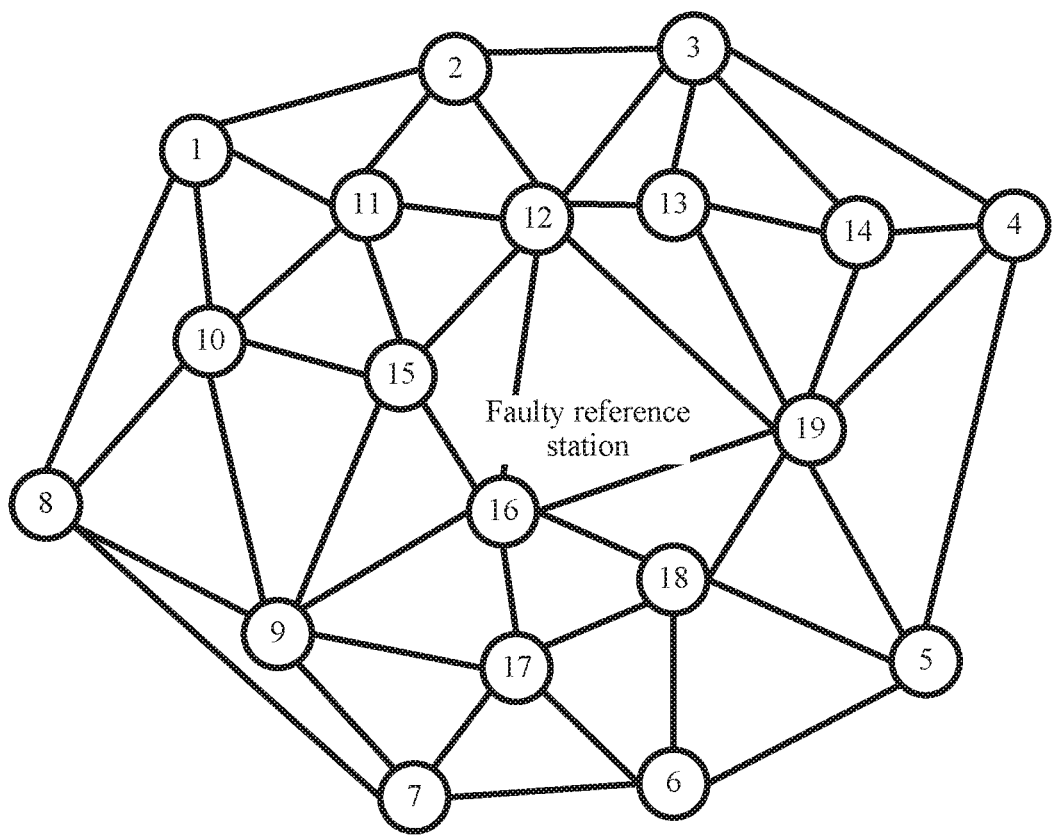
FIG. 13 and FIG. 14 are schematic diagrams of a method for selecting a network construction range when a faulty reference station is deleted according to an embodiment of this application.
Figure 14:
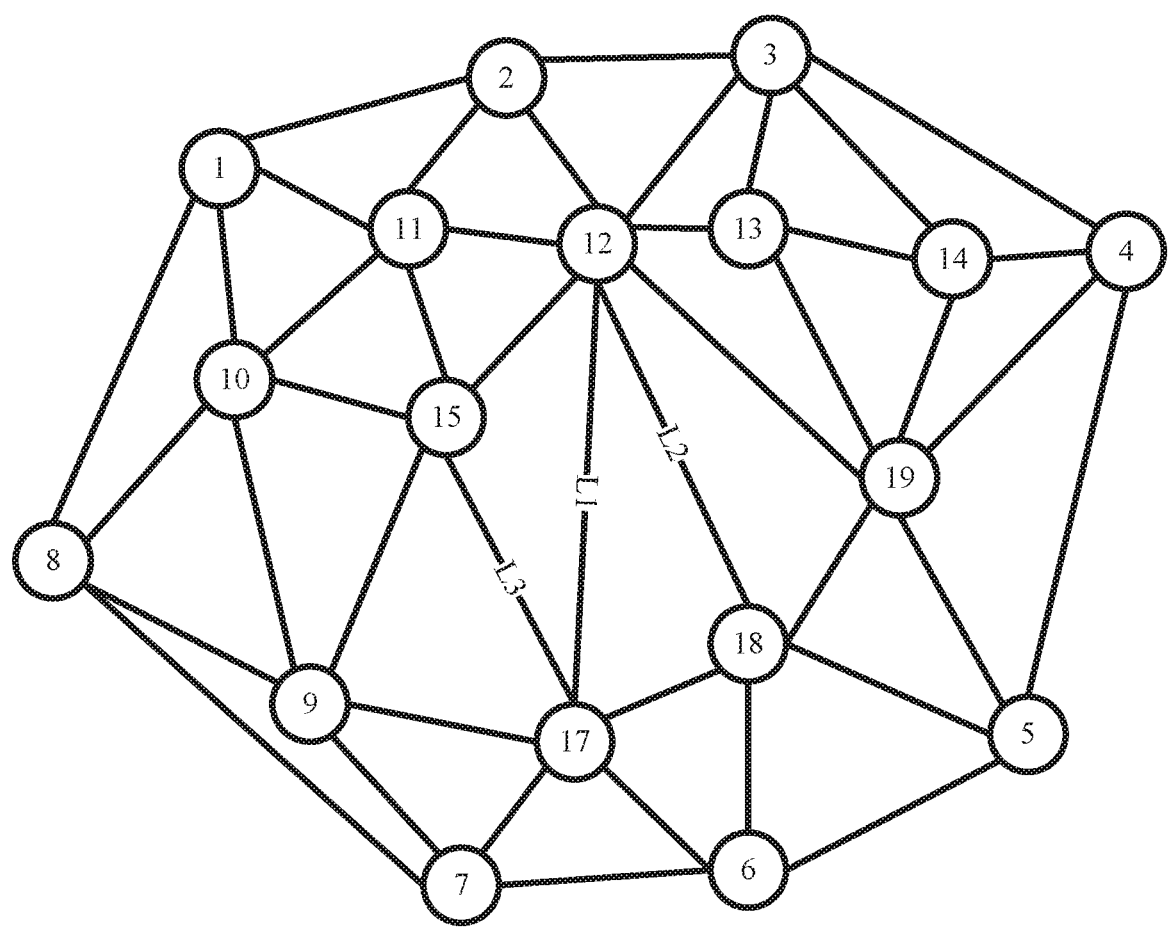

The foregoing describes a method for performing dynamic network construction when a station is newly added. With reference to FIG. 13 and FIG. 14, the following describes in detail a method for performing dynamic network construction when a station is deleted from an original reference station network in the embodiments of this application.

In network RTK positioning, when a reference station is faulty because of a communication fault, a power failure, or another cause, a range surrounded by a triangle in which a faulty node representing the reference station is located is an update range. After this station is deleted, network construction is re-performed on all nodes within this range (including a boundary), to obtain a new network topology, thereby implementing real-time construction of a new network and implementing local hitless update. After network construction is completed, the new network topology is compared with a network topology before reconstruction to find a newly added baseline. According to the Delaunay triangulated network construction principle, a reference station triangulated network whose basic structure is a triangle formed by three baseline vectors is formed. Status parameters of the newly added baseline such as an ionospheric error, a tropospheric error, and ambiguity may be obtained through smooth evolution by using status parameters of the known baseline vector such as an ionospheric error, a tropospheric error, and ambiguity according to a vector algorithm, to ensure that the system can continuously provide a service for the user. When the status parameters of the newly added baseline are being calculated, an endpoint of any baseline is used as a start point, the other endpoint is used as an end point, known baselines are searched for a shortest path from the start point to the end point by using a breadth first search algorithm (the breadth first search algorithm is a known search algorithm that can ensure that a shortest path to a target status is found), and then the status parameters of the newly added baseline are obtained through a vector operation by using the found known baseline vector in a baseline direction.

It should be understood that in the technical solution provided in this application, a network reconstruction manner in the prior art may be used. A network reconstruction manner used when a station is deleted is not limited in this application.

Therefore, in the method for updating a network RTK reference station network provided in this embodiment of this application, when a faulty reference station needs to be deleted from a reference station network, a new baseline is obtained through network reconstruction, and a status parameter of the new baseline is quickly calculated by using a vector addition method based on a status parameter of a known baseline, to improve working efficiency and ensure that the system continuously provides a service.

When a reference station is faulty and the station needs to be deleted, a range surrounded by a triangle in which the faulty node is located is selected as an update range of the reference station network. According to "an empty circumcircle property that a circumcircle of each Delaunay triangle does not include any other point in a plane" and "a max-min interior angle property" of a Delaunay triangulated network, in other words, the circumcircle of each triangle includes only three points, when one station is faulty and needs to be deleted, all circumcircles of triangles using the node as a vertex are affected, and therefore the circumcircle includes only two points. This does not meet a network construction property of the Delaunay triangulated network. Therefore, when the reference station is faulty and needs to be deleted, the range surrounded by the triangle in which the faulty node is located is selected as the update range of the reference station network.

As shown in FIG. 13, when a faulty node 16 in a current reference station network is to be deleted, a range surrounded by all nodes 9, 15, 17, 12, 18, and 19 connected to the faulty node 16 is an update range, and after the faulty node 16 is deleted, Delaunay triangulated network construction is re-performed on all nodes within the update range. A result of the network construction is shown in FIG. 14.

It can be learned from a comparison of FIG. 13 and FIG. 14 that, L1, L2, and L3 in FIG. 14 are newly added baselines in the reference station network. For the baseline L2, a shortest path that is from an L2 start point (it is assumed that a point 12 is the start point) to an end point (a point 18 is the end point) and that passes through a known baseline is found by using a breadth first search method, namely, a shortest path to the end point that passes through a baseline 12-19 and a baseline 18-19. It is assumed that X represents each status parameter of a baseline, and each status parameter of the baseline L2 can be calculated by using a formula $X_{L2}=X_{12-19}+X_{18-19}$. After each status parameter of the newly added baseline is calculated, the newly added baseline may be considered as a known baseline for calculation of another baseline, and similarly, each status parameter of another newly added baseline is calculated in this way. For example, after each status parameter of L2 is calculated, each status parameter of the newly added baseline L1 may be calculated according to a formula $X_{L1}=X_{L1}+X_{17-18}$.

When a plurality of reference stations are faulty, after each faulty reference station is deleted, network construction may be sequentially performed. After all faulty stations are deleted and network construction is completed, status parameters of all newly added baselines are calculated together.

It should be understood that this embodiment of this application can be applied to a CORS system. When a reference station is newly established in the CORS system or when some reference stations are faulty and need to be deleted, network reconstruction is performed, and a new baseline appears in the CORS system, network reconstruction can be performed and a status parameter of a newly added baseline can be calculated by using this technology. This application can also be applied to a mobile network. When a positioning reference station and a mobile network base station are integrated into a network, the network includes a relatively large quantity of base stations, and a relatively large quantity of reference stations need to be additionally established. However, accuracy of a positioning apparatus of a single base station is low, costs of the single base station are low, and environments in which some reference stations are located may be relatively harsh. This causes the integrated network to dynamically change more frequently. When a reference station in the network changes, network reconstruction can be performed by using this technology. In addition, when a newly added reference station is located inside a reference station network, after local network construction is completed, an ionospheric error parameter and a tropospheric error parameter of the newly added station can be obtained through interpolation by using corresponding data of a surrounding reference station of the newly added station, and are used as initial values of filtering. Relatively high prior accuracy of the initial value may be assigned during filtering. Only an ambiguity parameter of the newly added station needs to be re-estimated. This significantly shortens initialization time and improves system working efficiency.

It should be noted that, updating of a reference station network provided in this embodiment of this application is described by using an example in which a range surrounded by all nodes connected to a determined target node is used as an update range. Alternatively, a range surrounded by all nodes connected to all the nodes connected to the target node may be used as an update range. This is not specifically limited in this application.

With reference to FIG. 2 to FIG. 14, the foregoing describes in detail the method for updating a network RTK reference station network according to the embodiments of this application. An apparatus embodiment of this application is provided below, and an apparatus may be configured to perform the method embodiment of this application. For details not disclosed in the apparatus embodiment of this application, refer to the method embodiment of this application.

Figure 15:
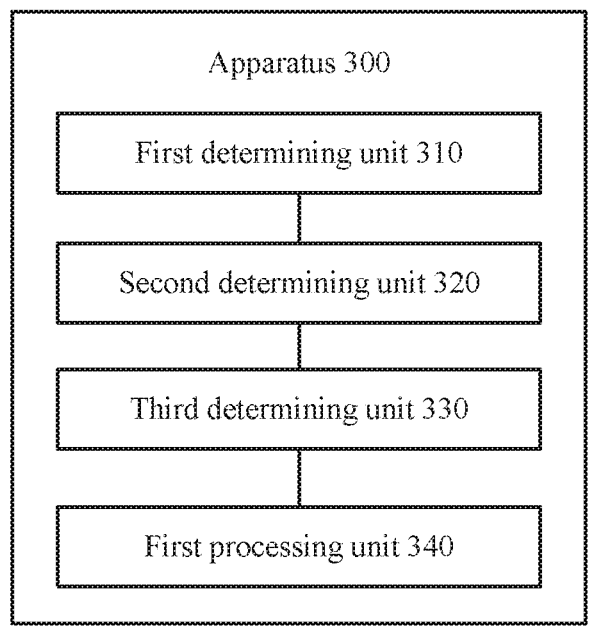
FIG. 15 is a schematic block diagram of an apparatus for updating a network RTK reference station network according to an embodiment of this application.

FIG. 15 is a schematic block diagram of an apparatus 300 for updating a network RTK reference station network according to an embodiment of this application. A reference station network is a Delaunay triangulated network including a plurality of reference stations on a two-dimensional plane, and a node in the reference station network represents one of the plurality of reference stations. As shown in FIG. 15, the apparatus 300 includes:

a first determining unit 310, configured to: if there is a newly added node in a current reference station network, determine a position relationship between the newly added node and each node in the current reference station network;

a second determining unit 320, configured to determine N target nodes in the current reference station network according to a preset rule based on the position relationship;

a third determining unit 330, configured to determine, based on the N target nodes, M nodes connected to each of the N target nodes, where the M nodes belong to the current reference station network; and a first processing unit 340, configured to perform network construction on the M nodes and the newly added node according to a Delaunay triangulated network construction rule, where M is a positive integer and N is a positive integer.

Therefore, according to the apparatus for updating a network RTK reference station network provided in this embodiment of this application, when a station is newly added, fast re-networking is implemented in a local range by using a visualized multitree based on a position relationship between the newly added station and a reference station network, and a process is simple and highly efficient.

Optionally, in an embodiment of this application, when the position relationship indicates that the newly added node is located inside a first triangle in the current reference station network, the second determining unit 320 is specifically configured to:

separately determine three vertices of the first triangle as target nodes, where there is only the newly added node inside the first triangle.

Optionally, in an embodiment of this application, when the position relationship indicates that the newly added node is located on a common side of two triangles in the current reference station network, the second determining unit 320 is specifically configured to:

separately determine four vertices of the two triangles as target nodes.

Optionally, in an embodiment of this application, when the position relationship indicates that the newly added node is located outside the current reference station network, the second determining unit 320 is specifically configured to:

determine a node closest to the newly added node as a target node.

Optionally, in an embodiment of this application, when the position relationship indicates that the newly added node is located on a boundary of the current reference station network, the second determining unit 320 is specifically configured to:

separately determine two endpoints of the boundary as target nodes.

Optionally, in an embodiment of this application, the apparatus 300 further includes:

a fourth determining unit, configured to: after network construction is performed on the M nodes and the newly added node according to the Delaunay triangulated network construction rule, obtain an initial value of a status parameter of the newly added node by using an interpolation method based on status parameters of two nodes that constitute a triangle with the newly added node, where the status parameter includes a tropospheric error parameter and an ionospheric error parameter.

Optionally, in an embodiment of this application, the apparatus 300 further includes:

a fifth determining unit, configured to: if there is a faulty node in a first reference station network, determine, in the first reference station network based on the faulty node, J nodes connected to the faulty node;

a second processing unit, configured to: after the faulty node is deleted, perform network construction on the J nodes according to the Delaunay triangulated network construction rule to obtain a second reference station network;

a sixth determining unit, configured to determine a newly added baseline in the second reference station network based on the first reference station network and the second reference station network; and an obtaining unit, configured to obtain a status parameter of the newly added baseline based on a status parameter of a non-updated baseline, where J is a positive integer, a reference station network obtained by performing network construction on the M nodes and the newly added node according to the Delaunay triangulated network construction rule is the first reference station network, a baseline represents relative positions of two reference stations, the non-updated baseline constitutes a shortest path from a start point of the newly added baseline to an end point of the newly added baseline, and the status parameter includes an ionospheric error parameter, a tropospheric error parameter, and an ambiguity parameter.

Optionally, in an embodiment of this application, the apparatus 300 further includes:

a storage unit, configured to store a network structure of the first reference station network, to update the second reference station network to the first reference station network based on the network structure of the first reference station network when a reference station represented by the faulty node returns to normal.

Therefore, according to the apparatus for updating a network RTK reference station network provided in this embodiment of this application, when a station is newly added, fast re-networking is implemented in a local range by using a multitree, and an initial value of a tropospheric error parameter and an initial value of an ionospheric error parameter of the newly added station are obtained through interpolation, to implement fast networking, improve efficiency, and shorten initialization time.

It should be understood that the apparatus 300 for updating a network RTK reference station network according to this embodiment of this application may be corresponding to an execution body of the method 100 for updating a network RTK reference station network according to the embodiments of this application. The foregoing and other operations and/or functions of the modules in the apparatus 300 are separately used to implement corresponding procedures of the methods in FIG. 2 to FIG. 14. For brevity, details are not described herein again.

It should be noted that, when the apparatus provided in the foregoing embodiment implements functions of the apparatus, division of the foregoing functional units is merely used as an example for description. In actual application, the foregoing functions may be allocated to different functional units for implementation as required. In other words, an internal structure of the device is divided into different functional units to implement all or some of the functions described above. In addition, the apparatus provided in the foregoing embodiment has a same concept as the method embodiment. For a specific implementation process of the apparatus, refer to the method embodiment. Details are not described herein again.

Figure 16:
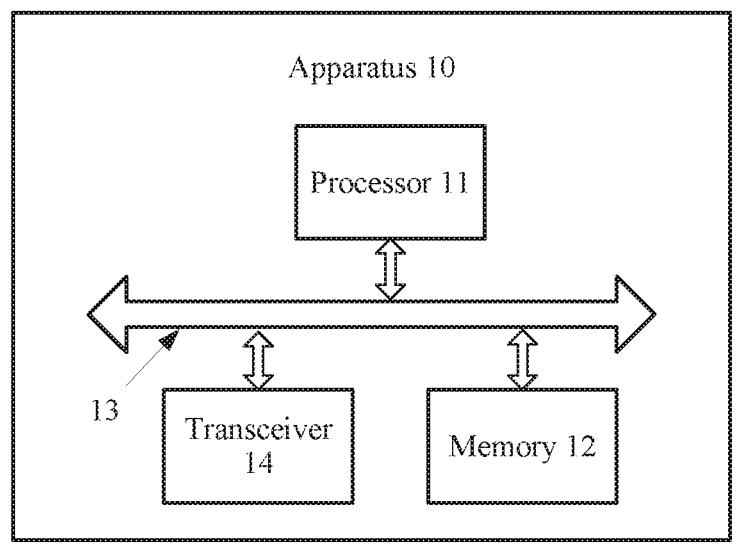
FIG. 16 is another schematic block diagram of an apparatus for updating a network RTK reference station network according to an embodiment of this application.

As shown in FIG. 16, an embodiment of this application further provides an apparatus 10 for updating a network RTK reference station network. A reference station network is a Delaunay triangulated network including a plurality of reference stations on a two-dimensional plane, and a node in the reference station network represents one of the plurality of reference stations. The apparatus 10 includes a processor 11, a memory 12, a bus system 13, and a transceiver 14. The processor 11, the memory 12, and the transceiver 14 are connected by using the bus system 13. The memory 12 is configured to store an instruction. The processor 11 is configured to execute the instruction stored in the memory 12, to perform the following steps when executing the instruction:

if there is a newly added node in a current reference station network, determining a position relationship between the newly added node and each node in the current reference station network; determining N target nodes in the current reference station network according to a preset rule based on the position relationship; determining, based on the N target nodes, M nodes connected to each of the N target nodes, where the M nodes belong to the current reference station network; and performing network construction on the M nodes and the newly added node according to a Delaunay triangulated network construction rule, where M is a positive integer and N is a positive integer.

Therefore, according to the apparatus for updating a network RTK reference station network provided in this embodiment of this application, when a station is newly added, fast re-networking is implemented in a local range by using a visualized multitree based on a position relationship between the newly added station and a reference station network, and a process is simple and highly efficient.

It should be understood that in this embodiment of this application, the processor 11 may be a central processing unit (Central Processing Unit, CPU), or the processor 11 may be another general purpose processor, a digital signal processor, an application-specific integrated circuit, a field programmable gate array or another programmable logic device, a discrete gate or a transistor logic device, a discrete hardware component, or the like. The general purpose processor may be a microprocessor or the processor may be any conventional processor, or the like.

The memory 12 may include a read-only memory and a random access memory, and provides an instruction and data for the processor 11. A part of the memory 12 may further include a nonvolatile random access memory. For example, the memory 12 may further store device type information.

In addition to a data bus, the bus system 13 may include a power bus, a control bus, a status signal bus, and the like. However, for clarity of description, various buses are marked as the bus system 13 in the figure.

In an implementation process, each step of the foregoing method may be completed by using an integrated logical circuit of hardware in the processor 11 or an instruction in a form of software. The steps of the methods disclosed with reference to the embodiments of this application may be directly performed and completed through a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 12, and the processor 11 reads information in the memory 12 and implements the steps of the foregoing method in combination with hardware of the processor 33. To avoid repetition, details are not described herein.

Optionally, in an embodiment of this application, when the position relationship indicates that the newly added node is located inside a first triangle in the current reference station network, the processor 11 is specifically configured to:

separately determine three vertices of the first triangle as target nodes, where there is only the newly added node inside the first triangle.

Optionally, in an embodiment of this application, when the position relationship indicates that the newly added node is located on a common side of two triangles in the current reference station network, the processor 11 is specifically configured to:

separately determine four vertices of the two triangles as target nodes.

Optionally, in an embodiment of this application, when the position relationship indicates that the newly added node is located outside the current reference station network, based on the position relationship, the processor 11 is specifically configured to:

determine a node closest to the newly added node as a target node.

Optionally, in an embodiment of this application, when the position relationship indicates that the newly added node is located on a boundary of the current reference station network, based on the position relationship, the processor 11 is specifically configured to:

separately determine two endpoints of the boundary as target nodes.

Optionally, in an embodiment of this application, the processor 11 is further configured to:

obtain an initial value of a status parameter of the newly added node by using an interpolation method based on status parameters of two nodes that constitute a triangle with the newly added node, where the status parameter includes a tropospheric error parameter and an ionospheric error parameter.

Optionally, in an embodiment of this application, the processor 11 is further configured to:

if there is a faulty node in a first reference station network, determine, in the first reference station network based on the faulty node, J nodes connected to the faulty node;

after the faulty node is deleted, perform network construction on the J nodes according to the Delaunay triangulated network construction rule to obtain a second reference station network;

determine a newly added baseline in the second reference station network based on the first reference station network and the second reference station network; and obtain a status parameter of the newly added baseline based on a status parameter of a non-updated baseline, where J is a positive integer, a reference station network obtained by performing network construction on the M nodes and the newly added node according to the Delaunay triangulated network construction rule is the first reference station network, a baseline represents relative positions of two reference stations, the non-updated baseline constitutes a shortest path from a start point of the newly added baseline to an end point of the newly added baseline, and the status parameter includes an ionospheric error parameter, a tropospheric error parameter, and an ambiguity parameter.

Optionally, in an embodiment of this application, the processor 11 is further configured to:

store a network structure of the first reference station network, to update the second reference station network to the first reference station network based on the network structure of the first reference station network when a reference station represented by the faulty node returns to normal.

Therefore, according to the apparatus for updating a network RTK reference station network provided in this embodiment of this application, when a station is newly added, fast re-networking is implemented in a local range by using a multitree, and an initial value of a tropospheric error parameter and an initial value of an ionospheric error parameter of the newly added station are obtained through interpolation, to implement fast networking, improve efficiency, and shorten initialization time.

It should be understood that the apparatus 10 according to this embodiment of this application may be corresponding to an execution body of the method 100 according to the embodiments of this application, and may be corresponding to the apparatus 300 according to the embodiments of this application. The foregoing and other operations and/or functions of the modules in the apparatus 10 are separately used to implement corresponding procedures of the methods in FIG. 2 to FIG. 14. For brevity, details are not described herein again.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should be understood further that determining B according to A does not mean that B is determined according to A only; that is, B may also be determined according to A and/or other information.

It should be further understood that, unless the context clearly supports an exception, a single form "one" ("a", "an", "the") used herein also intends to include a plural form. It should be further understood that "and/or" used herein intends to include any and all possible combinations of one or more correlated items that are listed.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for updating a network real time kinematic (RTK) reference station network, comprising:
   determining a position relationship between a newly added node and each node in a current reference station network when there is the newly added node in the current reference station network, wherein the reference station network is a Delaunay triangulated network consisting of a plurality of reference stations on a two-dimensional plane, wherein a node in the reference station network represents one of the plurality of reference stations;
   determining N target nodes in the current reference station network according to a preset rule based on the position relationship;
   determining, based on the N target nodes, M nodes that are directly connected to the N target nodes, wherein the M nodes belong to the current reference station network; and
   performing network construction on the M nodes that are directly connected to the N target nodes, the N target nodes, and the newly added node according to a Delaunay triangulated network construction rule, wherein M is a positive integer and N is a positive integer.

2. The method of claim 1, further comprising determining the N target nodes in the current reference station network comprises separately determining three vertices of a first triangle as target nodes when the position relationship indicates that the newly added node is located inside the first triangle in the current reference station network, wherein there is only the newly added node inside the first triangle.

3. The method of claim 2, wherein after performing network construction on the M nodes and the newly added node according to a Delaunay triangulated network construction rule, the method further comprises obtaining an initial value of a status parameter of the newly added node using an interpolation method based on status parameters of two nodes that constitute a triangle with the newly added node, wherein the status parameter comprises a tropospheric error parameter and an ionospheric error parameter.

4. The method of claim 1, further comprising determining the N target nodes in the current reference station network comprises separately determining four vertices of two triangles as target nodes when the position relationship indicates that the newly added node is located on a common side of the two triangles in the current reference station network.

5. The method of claim 1, further comprising determining the N target nodes in the current reference station network comprises determining two endpoints of a boundary closest to the newly added node as target nodes when the position relationship indicates that the newly added node is located outside the current reference station network.

6. The method of claim 1, further comprising determining the N target nodes in the current reference station network comprises separately determining two endpoints of a boundary of the current reference station network as target nodes when the position relationship indicates that the newly added node is located on the boundary.

7. The method of claim 1, wherein the method further comprises:
- determining, based on a faulty node in a first reference station network, J nodes connected to the faulty node when the faulty node is in the first reference station network wherein the J nodes belong to the first reference station network;
- performing network construction on the J nodes according to the Delaunay triangulated network construction rule after the faulty node is deleted to obtain a second reference station network;
- determining a newly added baseline in the second reference station network based on the first reference station network and the second reference station network;
- obtaining a status parameter of the newly added baseline based on a status parameter of a non-updated baseline, wherein J is a positive integer;
- performing network construction on the M nodes and the newly added node according to the Delaunay triangulated network construction rule; and
- obtaining a reference station network based on the network construction on the M nodes and the newly added node, wherein the reference station network is the first reference station network, wherein a baseline represents relative positions of two reference stations, wherein the non-updated baseline constitutes a shortest path from a start point of the newly added baseline to an end point of the newly added baseline, and wherein the status parameter comprises an ionospheric error parameter, a tropospheric error parameter, and an ambiguity parameter.

8. The method of claim 7, wherein the method further comprises storing a network structure of the first reference station network to update the second reference station network to the first reference station network when a reference station represented by the faulty node returns to normal.

9. The method of claim 1, further comprising applying a visualized multitree based on a position relationship between the newly added node and each node in the current reference station network.

10. An apparatus for updating a network real time kinematic (RTK) reference station network, wherein the apparatus comprises:
- a transceiver;
- a memory, configured to store an instruction; and
- a processor, connected to the memory and the transceiver, and configured to execute the instruction stored in the memory, that cause the apparatus to be configured to:
  - determine a position relationship between a newly added node and each node in a current reference station network when there is the newly added node in the current reference station network, wherein the reference station network is a Delaunay triangulated network consisting of a plurality of reference stations on a two-dimensional plane, wherein a node in the reference station network represents one of the plurality of reference stations;
  - determine N target nodes in the current reference station network according to a preset rule based on the position relationship;
  - determine, based on the N target nodes, M nodes that are directly connected to the N target nodes, wherein the M nodes belong to the current reference station network; and
  - perform network construction on the M nodes that are directly connected to the N target nodes, the N target nodes, and the newly added node according to a Delaunay triangulated network construction rule, wherein M is a positive integer and N is a positive integer.

11. The apparatus of claim 10, wherein the instruction further causes the apparatus to be configured to separately determine three vertices of a first triangle as target nodes when the position relationship indicates that the newly added node is located inside the first triangle in the current reference station network, wherein there is only the newly added node inside the first triangle.

12. The apparatus of claim 11, wherein the instruction further causes the apparatus to be configured to obtain an initial value of a status parameter of the newly added node using an interpolation method based on status parameters of two nodes that constitute a triangle with the newly added node, wherein the status parameter comprises a tropospheric error parameter and an ionospheric error parameter.

13. The apparatus of claim 10, wherein the instruction further causes the apparatus to be configured to separately determine four vertices of two triangles as target nodes when the position relationship indicates that the newly added node is located on a common side of the two triangles in the current reference station network.

14. The apparatus of claim 10, wherein the instruction further causes the apparatus to be configured to determine a node closest to the newly added node target nodes when the position relationship indicates that the newly added node is located outside the current reference station network.

15. The apparatus of claim 10, wherein the instruction further causes the apparatus to be configured to separately determine two endpoints of a boundary of the current reference station network as target nodes when the position relationship indicates that the newly added node is located on the boundary.

16. The apparatus of claim 10, wherein the instruction further causes the apparatus to be configured to:
- determine, based on a faulty node in a first reference station network, J nodes connected to the faulty node when the faulty node is in the first reference station network, wherein the J nodes belong to the first reference station network;
- perform network construction on the J nodes according to the Delaunay triangulated network construction rule after the faulty node is deleted to obtain a second reference station network;
- determine a newly added baseline in the second reference station network based on the first reference station network and the second reference station network;
- obtain a status parameter of the newly added baseline based on a status parameter of a non-updated baseline, wherein J is a positive integer; and
- obtain a reference station network based on the network construction on the M nodes and the newly added node, wherein the reference station network is the first reference station network, wherein a baseline represents relative positions of two reference stations, wherein the non-updated baseline constitutes a shortest path from a start point of the newly added baseline to an end point of the newly added baseline, and wherein the status parameter comprises an ionospheric error parameter, a tropospheric error parameter, and an ambiguity parameter.

17. The apparatus of claim 16, wherein the instruction further causes the apparatus to be configured to store a network structure of the first reference station network to update the second reference station network to the first reference station network when a reference station represented by the faulty node returns to normal.

18. The apparatus of claim 10, wherein the instruction further causes the apparatus to be configured to determine two endpoints of a boundary closest to the newly added node as target nodes when the position relationship indicates that the newly added node is located outside the current reference station network.

19. The apparatus of claim 10, wherein the instruction further causes the apparatus to be configured to separately determine two endpoints of a boundary of the current reference station network as target nodes when the position relationship indicates that the newly added node is located on the boundary.

20. The apparatus of claim 10, wherein the instruction further causes the apparatus to be configured to apply a visualized multitree based on a position relationship between the newly added node and each node in the current reference station network.

* * * * *